(12) United States Patent
Bode et al.

(10) Patent No.: US 10,315,389 B2
(45) Date of Patent: Jun. 11, 2019

(54) SEMI-FINISHED PRODUCT, METHOD FOR PRODUCING A SEMI-FINISHED PRODUCT AND USE THEREOF

(71) Applicants: ThyssenKrupp Steel Europe AG, Duisburg (DE); ThyssenKrupp AG, Essen (DE)

(72) Inventors: Lars Bode, Düsseldorf (DE); Ralf Sünkel, Ratingen (DE)

(73) Assignees: ThyssenKrupp Steel Europe AG, Essen (DE); thyssenkrupp AG, Essen (DE)

( * ) Notice: Subject to any disclaimer, the term of this patent is extended or adjusted under 35 U.S.C. 154(b) by 0 days.

(21) Appl. No.: 15/529,991

(22) PCT Filed: Nov. 3, 2015

(86) PCT No.: PCT/EP2015/075521
§ 371 (c)(1),
(2) Date: May 25, 2017

(87) PCT Pub. No.: WO2016/083083
PCT Pub. Date: Jun. 2, 2016

(65) Prior Publication Data
US 2017/0341343 A1    Nov. 30, 2017

(30) Foreign Application Priority Data
Nov. 27, 2014    (DE) .................. 10 2014 017 492

(51) Int. Cl.
B32B 15/18 (2006.01)
B32B 5/18 (2006.01)
(Continued)

(52) U.S. Cl.
CPC ............... *B32B 15/18* (2013.01); *B32B 5/18* (2013.01); *B32B 15/046* (2013.01); *B32B 15/08* (2013.01);
(Continued)

(58) Field of Classification Search
CPC ..... B32B 15/18; B32B 37/14; B32B 2250/02; B32B 2309/105; B32B 2605/00; B32B 2605/08; B32B 2255/06
See application file for complete search history.

(56) References Cited

U.S. PATENT DOCUMENTS

| | | | |
|---|---|---|---|
| 4,722,855 A | 2/1988 | Bauchhenss | |
| 2002/0132059 A1* | 9/2002 | Maddox | ............ C08F 290/048 427/487 |

(Continued)

FOREIGN PATENT DOCUMENTS

| | | |
|---|---|---|
| CN | 101641415 B | 4/2013 |
| CN | 101678648 B | 5/2013 |

(Continued)

OTHER PUBLICATIONS

International Search Report and Written Opinion for International Application No. PCT/EP2015/075521 dated Jan. 22, 2016, 3 pages.

(Continued)

*Primary Examiner* — Vishal I Patel
(74) *Attorney, Agent, or Firm* — RMCK Law Group PLC

(57) ABSTRACT

The disclosure relates to a blank-shaped or strip-shaped semi-finished product comprising at least one first metal layer and at least one plastics layer, which are joined over their full area to one another to form a metal/plastic composite. The material thickness of the metal layer is not more than 1.5 mm. The material thickness of the plastics layer is at least 0.2 mm. A method for producing said product is also provided. One object of the present invention, of providing (Continued)

a semi-finished product which is significantly lighter than the semi-finished products used in the prior art, is achieved for a semi-finished product.

20 Claims, 2 Drawing Sheets

(51) Int. Cl.
    *B32B 15/04*     (2006.01)
    *B32B 15/08*     (2006.01)
    *B32B 15/095*     (2006.01)
    *B32B 37/14*     (2006.01)

(52) U.S. Cl.
    CPC ............ *B32B 15/095* (2013.01); *B32B 37/14* (2013.01); *B32B 2250/02* (2013.01); *B32B 2250/03* (2013.01); *B32B 2255/00* (2013.01); *B32B 2255/06* (2013.01); *B32B 2255/24* (2013.01); *B32B 2255/26* (2013.01); *B32B 2309/105* (2013.01); *B32B 2605/00* (2013.01); *B32B 2605/08* (2013.01)

(56) References Cited

U.S. PATENT DOCUMENTS

2008/0085958 A1* 4/2008 Gros .................... C08G 18/792
                                            524/145
2009/0146463 A1   6/2009  Schleiermacher et al.
2010/0081001 A1   4/2010  Sander et al.
2010/0189957 A1*  7/2010  Naritomi ............... B32B 7/12
                                            428/141
2010/0233505 A1*  9/2010  Boger ................ B29C 44/326
                                            428/613
2011/0200816 A1*  8/2011  Mizrahi ................ B32B 15/02
                                            428/328

FOREIGN PATENT DOCUMENTS

| | | |
|---|---|---|
| CN | 101815612 B | 12/2014 |
| DE | 3531123 A1 | 3/1987 |
| DE | 3721849 A1 | 1/1989 |
| DE | 19730893 C1 | 7/1998 |
| DE | 10130005 A1 | 1/2003 |
| DE | 102007046187 A1 | 4/2009 |
| DE | 102012112821 A1 | 6/2014 |
| EP | 1270214 B1 | 9/2006 |
| EP | 2193021 B1 | 4/2014 |
| WO | 2014114370 A1 | 7/2014 |
| WO | 2015032623 A1 | 3/2015 |

OTHER PUBLICATIONS

Chinese Office Action and Search Report for CN Application No. 201580064875.0 dated Jul. 20, 2018, 12 pages.

\* cited by examiner

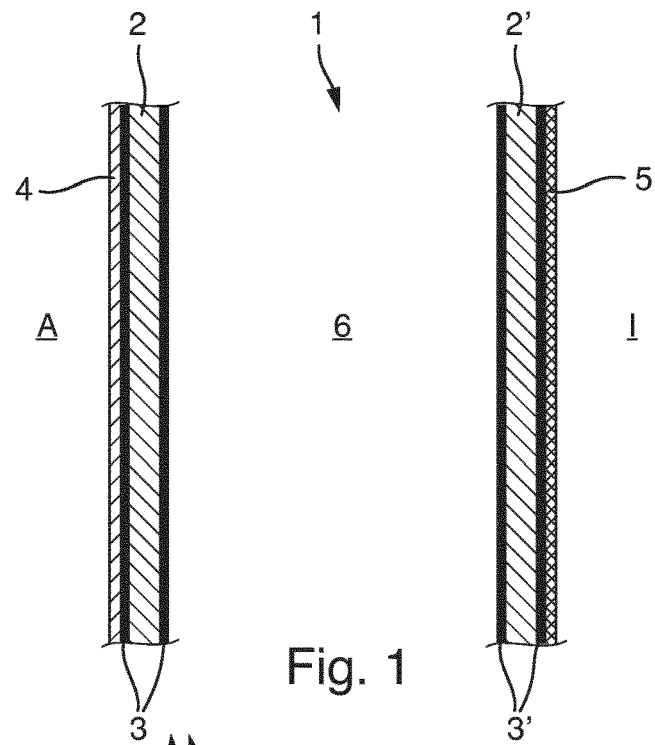
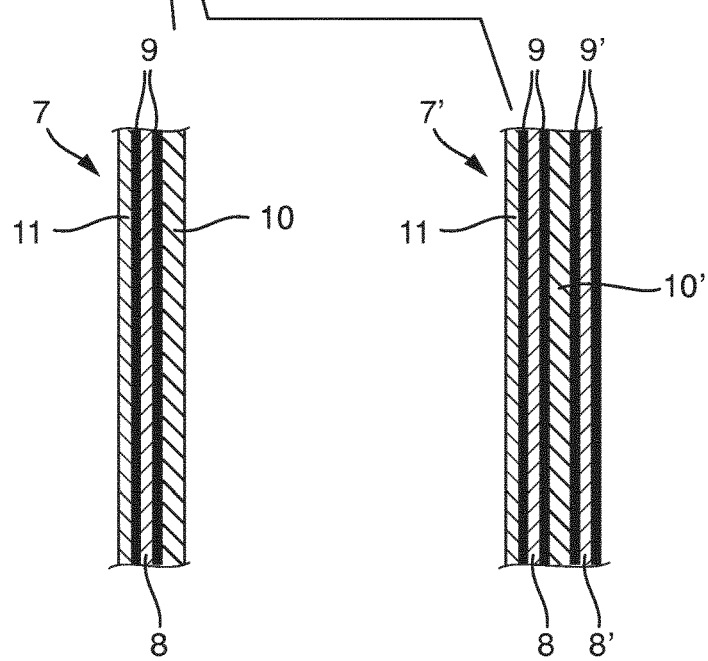

SEMI-FINISHED PRODUCT, METHOD FOR PRODUCING A SEMI-FINISHED PRODUCT AND USE THEREOF

CROSS-REFERENCE TO RELATED APPLICATIONS

This application is a 371 U.S. National Stage of International Application No. PCT/EP2015/075521, filed Nov. 3, 2015, which claims priority to German Application No. 10 2014 017 492.1 filed on Nov. 27, 2014. The disclosure of each of the above applications is incorporated herein by reference in their entirety.

FIELD

The disclosure relates to a blank-shaped or strip-shaped semifinished product comprising at least one first metal layer and at least one plastics layer, which are joined over their full area to one another to form a metal/plastic composite. The material thickness of the metal layer is not more than 1.5 mm and the material thickness of the plastics layer is at least 0.2 mm. The disclosure further relates to a method for producing said product and also to the use thereof.

BACKGROUND

Metal/plastic/metal composites, in particular, are known in the prior art. Under the tradename Litecor®, the applicant sells sandwich panels which consist of two sheet-steel cover layers having a material thickness between 0.2 to 0.3 mm, and a plastic core layer arranged between the sheet-steel cover layers and having a material thickness of at least 0.3 mm, these panels being outstandingly suitable as exterior and/or interior components of, in particular, a passenger automobile.

Additionally known from the prior art are components in particular for the paneling of, for example, commercial vehicles, especially of trailers, more particularly trunk constructions for refrigeration transport, composed of metal sandwich panels. In this case, for example, the outer surface used is a double-side hot-dip-galvanized coil coated steel panel, the inside surface used is a double-side hot-dip-galvanized steel panel coated with a food-resistant plastic, and a polyurethane foam core layer is used that is disposed between them (product information on "ISOPLUS II vario" from Rohr Nutzfahrzeuge). The steel panels used for the trunk construction have a material thickness of at least 0.6 mm. In order to ensure sufficient stability of the construction, and in view of the loads which occur during travel, which are high in particular, the specified thickness cannot be reduced further, at least not for this type of construction. In this field of application in particular, the potential for lightweight construction has not yet been exhausted. In other fields of application too, the possibility exists of making further weight savings in the context of the use of coil coated panels having material thicknesses of up to 3.0 mm, as in the case of garage doors, for example.

Also prior art is the form of strip coating referred to among experts as coil coating. As an example, information on the coating process can be picked up via the link http://de.wikipedia.org/wiki/Coil Coating. The coated substrates are generally steel strips, more particularly hot-dip-galvanized steel strips, and aluminum strips having material thicknesses of between 0.4 and 3.0 mm. Material thicknesses below 0.4 mm prove extremely difficult when implemented in coil coating lines, since coating over the full area, particularly at constant thickness, cannot be ensured on the relatively thin material.

SUMMARY

On the basis of the prior art, the object of the invention was to provide a semi-finished product which is significantly lighter than the semi-finished products used in the prior art, and also to specify a method for producing same and use thereof.

The object is achieved by the visible surface of the metal layer of the metal/plastic composite having a coil coating.

The inventors have ascertained that the combination of at least one metal layer and at least one plastics layer to form a metal/plastic composite which, in comparison to a solid metal material of at least the same material thickness, the metal layer having a thickness of not more than 1.5 mm, more particularly not more than 1.0 mm, preferably not more than 0.5 mm, and more preferably not more than 0.35 mm, and the thickness of the plastics layer being at least 0.2 mm, more particularly at least 0.3 mm, preferably at least 0.4 mm, lead on the one hand to a reduced mass and on the other hand in a coil coating operation, which can now also be coated without problems of metal layer thicknesses below the minimum thickness disclosed in the prior art.

According to a first embodiment of the semi-finished product of the invention, the metal layer is formed from a steel material. Steel materials, though somewhat heavier in comparison to other metals, especially in comparison to light metal materials, are nevertheless inexpensive to acquire and easy to process, particularly by cold forming. Use is made in particular of metallically coated, preferably double-side coated, steel materials. Suitable coatings include zinc-based or aluminum-based systems, with galvanized steel materials being used with particular preference, since they can be provided inexpensively.

According to a further embodiment of the semi-finished product of the invention, the semi-finished product comprises a second metal layer which is joined over its full area to the free surface of the plastics layer to form a metal/plastic/metal composite. The semi-finished product, formed as a sandwich, possesses high flexural stiffness and buckling stiffness, which at adapted thickness correspond essentially to those of a solid material, with a reduced mass at the same time. In order to ensure the potential for lightweight construction, the material thickness of the second metal layer is not more than 1.5 mm, more particularly not more than 1.0 mm, preferably not more than 0.5 mm, and more preferably not more than 0.35 mm. The second metal layer may preferably have the same properties as the first metal layer, depending on use of a coil coating or, alternatively, of other coating systems. Depending on the area of application, the metal layers may also have different thicknesses.

According to another embodiment of the semi-finished product of the invention, the visible surface of the first and/or second metal layer is textured. The texturing may on the one hand be applied as an elevation in the course of coil coating to the metal layer. This can be implemented, for example, by appropriately machined application rolls. By virtue of the fact that at least the first metal layer has low material thickness, there may be unevenesses in the material, which impart a negative appearance depending on application, in the case of large-area components for example, particularly in the case of paneling components, in adverse light and viewing conditions. In order to counteract this disadvantage, the elevations are able to compensate the unfavourable impression, in the form, for example, of repeating patterns, and to give an improved appearance. Alternatively or cumulatively, impressions after coil coating or, respectively, after the baking process may be shaped into the at least first metal layer, by means of an embossing roll, for example. It is advantageous on the one hand, as for the repeating patterns in the case of the elevations, for example, to give the at least first metal layer an improved appearance, but on the other hand a slight strengthening in the metal layer can also be produced. The embossing force should be adapted in particular such that there is no flow and no decrease in thickness of the plastics layer in the composite.

According to a further embodiment of the semi-finished product of the invention, the plastics layer is formed from a temperature-stable plastic. This is an advantage because the metal/plastic composite or metal/plastic/metal composite is exposed temporarily to high temperatures in the coil coating operation, especially during baking of an adhesion promoter (primer) applied beforehand, for example, and during baking of the coil coating or of the coating material applied to the metal layer. So that the plastic does not undergo decomposition or flow, the plastic used is preferably a plastic which is temperature-stable to at least 200° C., more particularly to at least 220° C. Preferred plastics are, for example, systems based on PA, PE and/or mixtures thereof.

In order to improve the stiffness and/or strength of the semi-finished product and/or to move the load-bearing function within the semifinished product into the plastics layer, it is possible, according to a further embodiment of the semi-finished product of the invention, to use a fiber-reinforced plastic. Of preferred suitability in particular are plastics systems admixed with glass, carbon and/or natural fibers, more particularly with biodegradable fibers; depending on the nature of the fiber, the level of the strength and/or stiffness of the plastic may be influenced, also in particular through the proportion of the filled content. The fibers used are preferably temperature-stable to at least 200° C., more particularly to at least 220° C.

According to a further aspect, the invention relates to a method for producing an at least single-side coated, blank-shaped or strip-shaped semi-finished product, which by the use of a semi-finished product, which comprises at least a first metal layer and at least one plastics layer, which are joined to one another over their full area to form a metal/plastic composite, the material thickness of the metal layer being not more than 1.5 mm and the material thickness of the plastic layer being at least 0.2 mm, the visible surface of the metal layer of the metal/plastic composite being coated in a coil coating process. According to a first embodiment of the method of the invention, a second metal layer is arranged, joined over its full area to the free surface of the plastic layer to form a metal/plastic/metal composite, the free surface of the second metal layer of the metal/plastic/metal composite being coated in a coil coating process. In order to avoid repetition, reference is made to the statements made above, particularly those concerning the semi-finished product of the invention.

According to a further embodiment of the method of the invention, the baking temperature, which, particularly for the baking of an adhesion promoter (primer) applied beforehand and for the baking of the coil coating, or of the coating material applied to the metal layer, is tailored to the plastic in such a way as to ensure the temperature stability of the plastic, a temperature of in particular not more than 220°, preferably not more than 200° C., being set.

According to a further embodiment of the method of the invention, the visible surface of the first and/or second metal layer is textured. This may on the one hand be applied as an elevation in the course of coil coating to the at least first and/or second metal layer, and/or on the other hand may be shaped into the metal layer by embossing after coil coating or, respectively, after the baking operation.

According to a further aspect, the invention relates to the use of a semi-finished product of the invention as a component, more particularly as a paneling component for, for example, commercial vehicles, trailers or white goods (household appliances). In order to avoid repetition, reference is made to the statements above.

BRIEF DESCRIPTION OF THE DRAWINGS

The invention is elucidated in more detail below by means of a drawing which represents exemplary embodiments. Identical parts are provided with identical reference symbols.

FIG. 1: shows a cross section through part of a trunk construction for refrigerated transport from the prior art, FIG. 2a): shows a section through a first example of an inventive semi-finished product which can be used as a paneling component, FIG. 2b): shows a section through a second example of an inventive semi-finished product which can be used as a paneling component.

DETAILED DESCRIPTION

Figure 3:
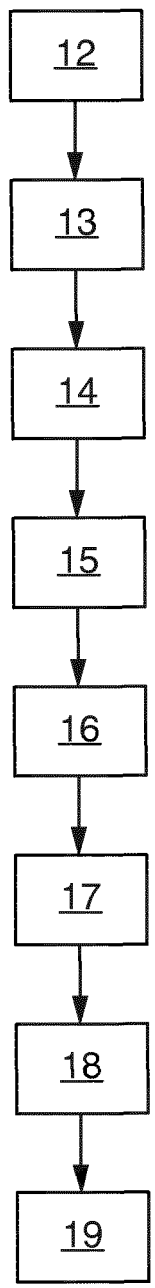
FIG. 3: shows a diagrammatic sequence of steps in a first example of an inventive method.

Depicted in FIG. 1 as an example is a cross section through a part of a trunk construction for refrigerated transport, comprising metal sandwich panels, as is currently implemented in the prior art. The metal sandwich panel 1 has, for example, a first steel panel 2, which is arranged on the outside A and which is provided on both sides of the steel panel 2 with a metallic coating 3, more particularly with a zinc coating. Applied to the outside A on the visible surface of the steel panel 2 is a further coating in the form of a coil coating 4. Disposed on the inside I of the metal sandwich panel 1 is a second steel panel 2', which is provided on both sides of the steel panel 2' with a metallic coating 3', more particularly with a zinc coating, and with a food-resistant organic layer 5, further to the inside I, and which has a material thickness which is the same, for example, as the material thickness of the first steel panel 2. Arranged between the steel panels 2, 2' is a plastics core 6, as for example a foamed plastic, which completes the metal sandwich panel 1. The material thickness of the steel panels 2, 2', especially that of the first steel panel 2, is 0.6 mm, for example, and cannot be lowered further in material thickness for stability reasons and because of high loads occurring during travel.

Depicted as a first embodiment of an inventive semi-finished product in FIG. 2a) is a semi-finished product 7 in the form of a metal/plastic composite. The semifinished product 7 comprises a metal layer 8, preferably of a steel material, which is double-side metallically coated 9, more particularly galvanized, preferably electrolytically galvanized, and which has a material thickness of, for example, 0.3 mm. The preferably double-side electrolytically coated steel material 8 is joined on one side over its full area to a plastics layer 10, which is temperature-stable to at least 200° C., more particularly to at least 220° C., and has a material thickness of, for example, 0.5 mm. On the side opposite the plastics layer, the visible side of the metal layer 8 is provided with a coil coating 11. The semi-finished product 7 of the invention is outstandingly suitable as a component, more particularly as a paneling component for commercial vehicles or trailers. It is true that the material thickness of the semi-finished product 7 is somewhat greater than the material thickness of the steel panel 2, but by reducing the proportion of metal in the inventive semi-finished product 7 it is possible to save mass when it is used, for example, as a paneling component, as part of a trunk construction for refrigeration transport, and the relatively thin metal layer can be readily implemented in combination with a plastics layer, in the form of a metal/plastics composite, by means of coil coating lines (not shown here). Likewise not shown here, the plastics layer may have fiber-reinforcement, which may in turn improve the stiffness and/or strength of the semi-finished product. It may well be the case that, when using fiber-reinforced plastic, a further reduction in the material thickness of the metal layer is possible, depending on application.

As a second embodiment of an inventive semi-finished product, FIG. 2b) shows a semi-finished product 7' in the form of a metal/plastic/metal composite. In contrast to the semi-finished product 7, the semi-finished product 7' has a second metal layer 8', preferably composed of a steel material, which is double-side metallically coated 9', more particularly galvanized, preferably electrolytically galvanized, and is joined over its full area to the free surface of the plastics layer 10'. The individual material thicknesses of the semi-finished product 7' for the first and second metal layers 8, 8' are, for example, 0.2 mm and, in the case of the plastics layer 10', 0.3 mm, for example. The advantages stated for the semi-finished product 7 can also be transposed to the semi-finished product 7'.

Not shown, it is possible, for example, for the visible surface at least of the first metal layer 8 to be textured, in order to impart an improved appearance to the subsequent use of the inventive semi-finished product 7, 7'.

In FIG. 3 there is a schematic sequence of steps for producing at least single-side coated, blank-shaped or strip-shaped semi-finished products, more particularly in a coil coating line. In step 12, preferably, a strip-shaped coil is provided which comprises either an aforesaid metal/plastic composite, provided on the plastics side preferably with a protective film to protect the plastics surface and in order to avoid sticking to the metal side in the wound state, this film being removed or peeled off subsequently, or comprises a metal/plastic/metal composite, the thickness of the metal layer being not more than 0.5 mm, more particularly not more than 0.4 mm, preferably not more than 0.35 mm, and more preferably not more than 0.3 mm, the metal layer being formed preferably from a steel material and being double-side coated, preferably electrolytically coated, and the thickness of the plastics layer being at least 0.2 mm, more particularly at least 0.3 mm, preferably at least 0.4 mm, and the plastic being temperature-stable to at least 200° C., more particularly to at least 220° C. The strip-shaped coil is unwound and supplied continuously to step 13 for the cleaning of the at least first metal layer. Passivation/activation of the at least first metal layer takes place in step 14, and so subsequently an adhesion promoter (primer) is applied (step 15) to the at least first metal layer by means of an application roll, this primer being baked (step 16) at a temperature which is tailored to the plastic in such a way as to ensure the temperature stability of the plastic in the assembly, the temperature set being more particularly not more than 220°, preferably not more than 200° C. In the next step 17, a coil coating is applied by an application roll to the at least first metal layer which already has the baked adhesion promoter, and this coil coating is baked in turn at a temperature (step 18) which corresponds essentially to the temperature in step 16. In step 19 there is either rewinding to form a strip-shaped semi-finished product, the coil coating being provided with a protective film, or the strip is cut into lengths to form blank-shaped semi-finished products.

Not shown here, the at least first metal layer may be textured. The texturing may be applied on the one hand as an elevation, in the course of the coil coating process, to the at least first metal layer, in step 18, for example. This can be implemented, for example, by correspondingly machined application rolls. Alternatively or cumulatively, embossments may be shaped, after the coil coating operation or after the baking operation, into the at least first metal layer, by means of an embossing roll after step 19, for example, the embossing force in particular being adapted such that there is no flow or decrease in thickness of the plastics layer in the composite. The material thickness of the metal layer (8, 8') is at least 0.05 mm, more particularly at least 0.1 mm, and preferably at least 0.15 mm. The material thickness of the plastics layer (10, 10') is not more than 3.0 mm, more particularly not more than 2.5 mm and preferably not more than 2.0 mm.

The invention is not confined to the exemplary embodiments shown in the drawing, and instead semi-finished products of the invention can be used in all sectors and may replace existing solutions (coil-coated metal panels) where an important part is played by weight reduction, as in the area of doors, industrial gates, garage doors, etc., for example. The use is not confined to vehicle construction or white goods.

LIST OF REFERENCE SYMBOLS

1 metal sandwich panel
2, 2' steel panel
3, 3' metallic coating
4 coil coating
5 food-resistant organic coating
6 plastics core
7 metal/plastic composite, semi-finished product
7' metal/plastic/metal composite, semi-finished product
8, 8' metal layer
9, 9' metallic coating
10, 10' plastics layer
11 coil coating
12 provision of a strip-shaped coil
13 cleaning
14 activation/passivation
15 application of adhesion promoter
16 baking of adhesion promoter
17 application of coil coating
18 baking of coil coating
19 rewinding/cutting to length

The invention claimed is:

1. A method for producing an at least single-side coated, blank-shaped or strip-shaped windable semi-finished product able of forming a coil, the method comprising:
   joining a first metal layer and at least one plastics layer over their full area to form a wound metal/plastic composite in a strip shaped windable coil;
   wherein a material thickness of the first metal layer is not more than 1.5 mm and a material thickness of the at least one plastics layer is at least 0.2 mm;
   unwinding the metal/plastic composite from the windable coil; and coating a visible surface of the metal layer of the metal/plastic composite in a coil coating process.

2. The method as claimed in claim 1, further comprising: arranging a second metal layer which is connected over its full area to the free surface of the plastics layer to form a metal/plastic/metal composite, wherein the visible surface of the second metal layer of the metal/plastic/metal composite is coated in a coating process.

3. The method as claimed in claim 2, further comprising baking the metal/plastic/metal composite such that the temperature stability of the plastic is ensured, a temperature of in particular at most 220° Celsius.

4. The method as claimed in claim 2, further comprising baking the metal/plastic/metal composite such that the temperature stability of the plastic is ensured, a temperature of in particular at most 200° Celsius.

5. The method as claimed in claim 1, wherein the visible surface of at least one of the first and second metal layer is textured subsequent to the coil coating process.

6. The method of claim 1 wherein the metal layer is formed from a double-side metallically coated steel material.

7. The method of claim 2 wherein a material thickness of the second metal layer being not more than 1.5 mm.

8. The method of claim 7 wherein the visible surface of the second metal layer of the metal/plastic/metal composite has a coil coating.

9. The method of claim 1 wherein the at least one plastics layer is formed from a temperature-stable plastic which is temperature-stable to at least 200° C.

10. The method of claim 1 wherein the at least one plastics layer is formed from a temperature-stable plastic which is temperature-stable to at least 220° C.

11. The method of claim 1 wherein the plastic is fiber-reinforced, the fibers used being temperature-stable to at least 200° C.

12. The method of claim 11 wherein the plastic is fiber-reinforced, the fibers used being temperature-stable to at least 220° C.

13. The method of claim 1, further comprising texturing at least one of the first and second metal layers in course of or after coil coating or after the baking.

14. The method of claim 1 further comprising applying a protective film on the at least one plastics layer to inhibit sticking to the first metal layer in a wound state; and winding the semi-finished product into a coil.

15. A method for producing an at least single-side coated, blank-shaped or strip-shaped windable semi-finished product able of forming a coil, the method comprising:

providing a strip-shaped wound coil formed of a metal/plastic composite wherein a material thickness of a metal layer is not more than 0.5 mm and a material thickness of a plastics layer is at least 0.2 mm;

unwinding the strip-shaped wound coil;

baking the metal/plastic composite such that an adhesion promoter is baked onto the metal layer of the metal/plastic composite;

further baking the metal/plastic composite such that a coil coating is applied onto the baked adhesion promoter; and one of (i) rewinding the strip-shaped coil into the windable semi-finished product, and (ii) cutting the strip into lengths to form the blank-shaped semi-finished product.

16. The method of claim 15 wherein baking the coil coating comprises baking at a temperature which is tailored to the plastics layer in such a way as to ensure temperature stability of the plastics layer in the semi-finished product.

17. The method of claim 16 wherein baking the coil coating comprises baking the metal/plastic composite having the coil coating at a temperature not more than 220° Celsius.

18. The method of claim 16 wherein baking the coil coating comprises baking the metal/plastic composite having the coil coating at a temperature not more than 200° Celsius.

19. The method of claim 15, further comprising:

texturing the metal layer.

20. The method of claim 19 wherein the metal layer is textured in the course of the coil coating.

* * * * *